United States Patent [19]

Kolze

[11] Patent Number: 5,058,624
[45] Date of Patent: Oct. 22, 1991

[54] FLOW CONTROL VALVE WITH STABLE MODULATION

[76] Inventor: Lawrence A. Kolze, 437 S. Addison St., Bensenville, Ill. 60106

[21] Appl. No.: 554,431

[22] Filed: Jul. 19, 1990

[51] Int. Cl.$^5$ .............................................. F16K 11/24
[52] U.S. Cl. .................. 137/607; 137/614.14; 251/30.04
[58] Field of Search ............ 137/606, 607, 614.14; 251/30.03, 30.04

[56] References Cited

U.S. PATENT DOCUMENTS

| | | | |
|---|---|---|---|
| 2,833,304 | 5/1958 | Fish | 137/614.14 X |
| 2,899,972 | 8/1959 | Matthews | 137/614.14 X |
| 3,011,751 | 12/1961 | Delany et al. | 251/30.03 |
| 3,185,172 | 5/1965 | Hajek | 137/614.14 X |
| 3,476,147 | 11/1969 | Hitt et al. | 137/614.14 |
| 3,655,163 | 4/1972 | Rattan et al. | 251/30.03 X |
| 3,672,627 | 6/1972 | McCarty et al. | 251/30.03 |
| 4,863,098 | 9/1989 | Kolze | 251/30.03 X |

FOREIGN PATENT DOCUMENTS 1133954 7/1962 Fed. Rep. of Germany ... 251/30.04

Primary Examiner—Stephen M. Hepperle

[57] ABSTRACT

A pilot operated flow modulating control valve with a pilot valve to incrementally control the position of the control valve and flow. The control valve has a closure valve for blocking flow through the valve and an oppositely acting but integral modulating valve that modulates flow through the control valve. An electromagnetic coil driven actuator has a pilot seal that modulates flow through a pilot passage in the control valve to effect following movement of the control valve. A relatively low voltage through the coil positions the control valve in its maximum flow position and a relatively high voltage through the coil moves the control valve in its modulating positions, minimizing inadvertent control valve instability from transient voltages or pressures when the valve is modulating.

23 Claims, 4 Drawing Sheets

FLOW CONTROL VALVE WITH STABLE MODULATION

BACKGROUND OF THE INVENTION

Mixing valve assemblies have been used in the past for many years in clotheswashing machines for mixing predetermined proportions of hot and cold water to provide the appliance with the desired temperature water, as well as controlling the flow rate of the water supplied.

Typically, these mixing valves include two diaphragm operated valves, one for cold water and one for hot water with some type of control system for actuating either the hot or cold water valve, or for actuation of both valves to give a mix of the hot and cold fluids. These valves are very limited in mix temperature control due to effects of different inlet pressures of the hot and cold, water temperature variables, and different flow pressure drops through each section of the mixing valve itself. Thus, outlet mix temperature of these valves is solely dependent upon whatever the full flow hot and cold valves will provide for the given variables and, therefore, little control of actual mix temperature is achieved.

Other previous mixing valves did provide control of the hot and cold mix temperature through a mechanical sensor/actuator which provided a selectivity of mix temperatures achieved by proportioning the hot and cold fluids from the solenoid operated valves in a mechanically proportioning mixing chamber. In these mixing valves, the hot and cold pilot operated valves were also either fully "on" or "off" and depended upon the thermostatically controlled mixing chamber to achieve some desired degree of mix temperature.

In the past these valves have included pilot operated diaphragm valves with actuators that control on/off flow through a pilot passage extending through the diaphragm and the position of this actuator has been controlled by an electromagnet. These prior diaphragm operated valves, however, have been found only useful in positioning the main diaphragm valve in either a fully opened or fully closed position because attempts in attaining modulating capability of these valves at the pilot valve orifice has been unreliable since the pilot valve under these conditions has been found to have an inherent propensity to inadvertently close and cause premature main valve closure, especially upon transient current or voltage surges through the electromagnetic coil or because of transient pressure surges at the valve inlet.

One such pilot operated diaphragm valve is disclosed in the McCarthy, Jr., et al., U.S. Pat. No. 3,672,627, and it includes a diaphragm operated main valve for controlling flow between an inlet and an outlet with one side of the diaphragm being exposed to inlet pressure and the opposite side of the diaphragm forming an intermediate chamber in the housing in which fluid pressure is controlled by an electromagnetic coil driven actuator reciprocal in the housing having a pilot seal at its inner end that selectively blocks flow through a central pilot passage in the main diaphragm valve.

With the electromagnetic coil de-energized, the actuator is biased by a coil spring to close this pilot passage and when fluid is introduced at the valve inlet, it is free to move into this intermediate chamber through a continuously open small offset passage extending through the diaphragm.

The intermediate chamber is then at a higher pressure than the outlet and the main diaphragm valve assembly is urged to its shut-off position due to the differential area caused by the main valve seat and the biasing force of the coil spring acting on the electromagnetic actuator armature.

When the windings of the electromagnetic coil are energized, the magnetic flux generated thereby moves the ferromagnetic actuator away from the diaphragm against the biasing force of the coil compression spring and fluid differential pressure force to unseat the pilot seal from the pilot passage in the diaphragm permitting flow through the pilot passage from the intermediate chamber to the outlet. This, of course, results in a reduction in pressure in the intermediate chamber and when the fluid pressure differential acting on the lower side of the diaphragm and the upper side of the diaphragm (intermediate chamber pressure) is sufficient, the diaphragm assembly, and hence the main valve will move upwardly away from the main valve seat permitting high pressure fluid to flow directly from the inlet to the outlet.

Because of the high initial current flow through the coil required to raise the actuator against the bias spring force and pressure differential force and cause opening movement of the main diaphragm valve assembly, the actuator will continue to move a considerable distance away from the diaphragm assembly until the magnetic actuation forces reach equilibrium with the spring force. This equilibrium point positions the actuator almost entirely within an associated guide bore in the coil assembly so that there is no modulation or restriction between the actuator seal and the pilot passage during this movement. The following diaphragm assembly then moves away from the main valve opening until it abuts a stop.

While the McCarty, et al. valve has been employed commercially solely as an on-off flow control valve as completely described in their patent, there have been unsuccessful experimental attempts to utilize the McCarty, et al. valve as a flow modulating valve. In these attempts, current flow through the coil was reduced after the initial high current flow to overcome the forces acting on the closed actuator, permitting the actuator to move downwardly as a result of the diminution in the flux field acting on the actuator. As the actuator and its pilot seal move toward the pilot passage, the differential pressure between the valve inlet and the intermediate chamber is reduced to achieve main flow modulation. The pressure drop across the pilot seal however, increases due to the flow restriction caused by the close proximity of the pilot seal to the pilot passage. The proximity of the pilot seal to the pilot passage is critical to where modulation of the main valve can be maintained without the pressure drop force across the pilot seal increasing to a valve wherein an inadvertent shut-off of the pilot passage occurs.

Because the main valve appeared to follow the actuator, the McCarty, et al. diaphragm valve assembly, at first blush, appeared capable of operating as a modulating valve with the appropriate reduction of coil current after opening. However, testing the McCarty, et al. valve in attempted modulating positions, particularly when a high differential pressure exists across the diaphragm, indicated the valve assembly to be very unstable not only under transient changes in inlet pressure, and transient current surges through the coil, but when tried under most controlled coil voltages and pressure.

This instability results from the close proximity of the actuator pilot seal from the pilot passage in the main diaphragm valve assembly and from lower armature engergizing force when the actuator and valve are attempted to be put into a modulating equilibrium position. In an exemplary modulating equilibrium position, the main valve assembly is open and the actuator seal is closely spaced to the diaphragm pilot passage so that its pilot seal is restricting flow through the pilot passage. The pilot actuator is stationary because the electromagnetic flux force is held constant for that position and is balanced by the force of the spring and the axial differential pressure acting thereon. At this time the diaphragm is in a stationary position because the differential pressures acting on the diaphragm's upper and lower surfaces produces a force balance.

The requirement for the seal being very close to the pilot opening in this balance position is due to the fact that the seal must be this close to sufficiently restrict pilot flow through the pilot passage to achieve the proper balance of forces acting on the main valve. The instability is also accentuated by the fact that there is a net downward differential pressure force acting on the actuator in this equilibrium position urging it to its closed position blocking flow through the pilot passage of the valve. This net differential pressure force is caused by the restriction established at the actuator seal area of the diaphragm pilot passage and acts across the area of the actuator seal immediately adjacent the pilot orifice to create a downward force on the actuator. In this nearly closed position of the actuator seal, any transient increase in inlet or intermediate chamber pressure increases the differential pressure and downward force acting on the actuator frequently causing inadvertent shut-off. The same result occurs from a transient drop in coil current.

While the McCarty, et al. valve is an excellent design for an on-off valve for which it is intended when originally designed, the tendency of the pilot valve to inadvertently close is unacceptable in a modulating valve since it drives the main valve to a closed position when it is not desired.

In my prior U.S. Pat. No. 4,863,098, another system for preventing inadvertent valve closure is disclosed. In that control valve an actuator pilot seal functions only to initiate opening and closing movement of the main valve and does not modulate pressure in the intermediate chamber, which is performed by a secondary valve modulating flow through an offset passage. Because of this the actuator, and particularly the actuator pilot seal, is by design, positioned sufficiently far away from the central pilot passage in the control valve assembly so that when the secondary valve is modulating or restricting the offset passage, it is unaffected by pilot passage pressure or pressure differential forces and, hence there is no significant differential fluid pressure force acting on the actuator when the control valve is open. Since the differential pressure force acting on the actuator remains essentially zero during modulation, transient changes in intermediate chamber pressure create no imbalance of the forces acting on the actuator and hence no unwanted downward pilot actuator forces. The force balance and position of the control valve utilizing the secondary valve is inherently stable. That is, whenever transient conditions occur to upset the desired force balance across the control valve, the secondary valve either opens or restricts to change the intermediate chamber pressure. This causes movement of the control valve in a direction opposite to the disturbing transient so that the correct control valve force balance is always maintained.

Furthermore, the significant spacing of the actuator pilot seal from the pilot passage also reduces the likelihood of other factors causing inadvertent downward relative movement of the actuator including transient inlet fluid pressure rise and transient current dips in the coil.

According to another embodiment disclosed in my prior patent, the pivotal secondary valve is replaced with a valve disk fixed to the lower end of the actuator that actuates a poppet valve reciprocably mounted in a stepped bore in the valve assembly interconnecting the inlet chamber and the intermediate chamber. This embodiment operates in the same manner and has the same advantages of the pivotal secondary valve in the first embodiment except for the mechanical advantage achieved by the pivotal valve. In the second embodiment, however, no spring is required to bias the secondary poppet valve to its closed position since the valve is constructed to be flow responsive and is made of a light-weight plastic to achieve buoyancy toward the valve closed position.

It is a primary object of the present invention to ameliorate the problems noted above in flow modulating control valves.

SUMMARY OF THE PRESENT INVENTION

In accordance with the present invention, an electromagnetic coil driven armature pilot operated flow modulating control valve is provided where inadvertent valve closure during flow modulation is minimized by a design that permits the valve to be modulated in a voltage range that is always above the minimum opening voltage of the valve. By eliminating modulation at voltages below the minimum opening voltage of the valve, the possibility of inadvertent valve closure due to voltage or pressure transients is dramatically minimized over prior art fluid flow modulating valves.

The negative flow versus voltage characteristic of this improved valve is achieved principally by the provision of a single reciprocating main valve that separates the functions of flow modulation and flow shut-off. That is, the main control valve has a shut-off valve of the diaphragm or piston type at its upper end and a flow modulation valve at its other end that inherently act oppositely. As the upper shut-off valve moves upwardly initiating flow, the lower modulating valve carried by the same valve stem moves upwardly restricting flow as the valve moves towards its modulation position.

In both embodiments disclosed, a pilot passage is provided completely axially through the valve connecting it to an intermediate chamber, formed by the shut-off valve, with the valve outlet. A secondary bleed passage through the valve connects the same intermediate chamber to the valve inlet.

An electromagnetically driven actuator having a pilot seal at its lower end (somewhat different in each embodiment) controls the position of the main control valve by restricting flow through the pilot passage, and thereby controls pressure within the intermediate chamber. Intermediate chamber pressure in turn causes movement of the main control valve.

When the minimum valve opening voltage is applied to the electromagnetic coil, the armature and seal move upwardly to an equilibrium position opening the pilot valve causing pressure in the intermediate chamber to reduce and the main control valve to move upwardly until the pilot passage is restricted by the seal and at that point the control valve is approximately at its fully open position with approximately equal flow areas provided by the shut-off valve and the modulating valve portions of the main valve. As voltage is further increased, the shut-off valve portion provides less restriction to flow because the modulating valve provides greater restriction as it moves toward its minimum flow position in the modulating flow range for the valve. Hence, flow modulation occurs only at voltages in excess of the minimum opening voltage.

In one embodiment the pilot passage extends coaxially through the control valve and the shut-off valve portion is a diaphragm, and the bleed passage is in the closure valve offset from the axis of the main control valve.

In the second embodiment of the invention, the pilot passage is offset from the main control valve in the shut-off valve and the lower end of the armature has a larger diameter seal. The bleed passage in this embodiment is coaxial with the main control valve.

Other objects and advantages of the present invention will appear more clearly from the following detailed description.

DETAILED DESCRIPTION OF THE PREFERRED EMBODIMENTS

Figure 1:
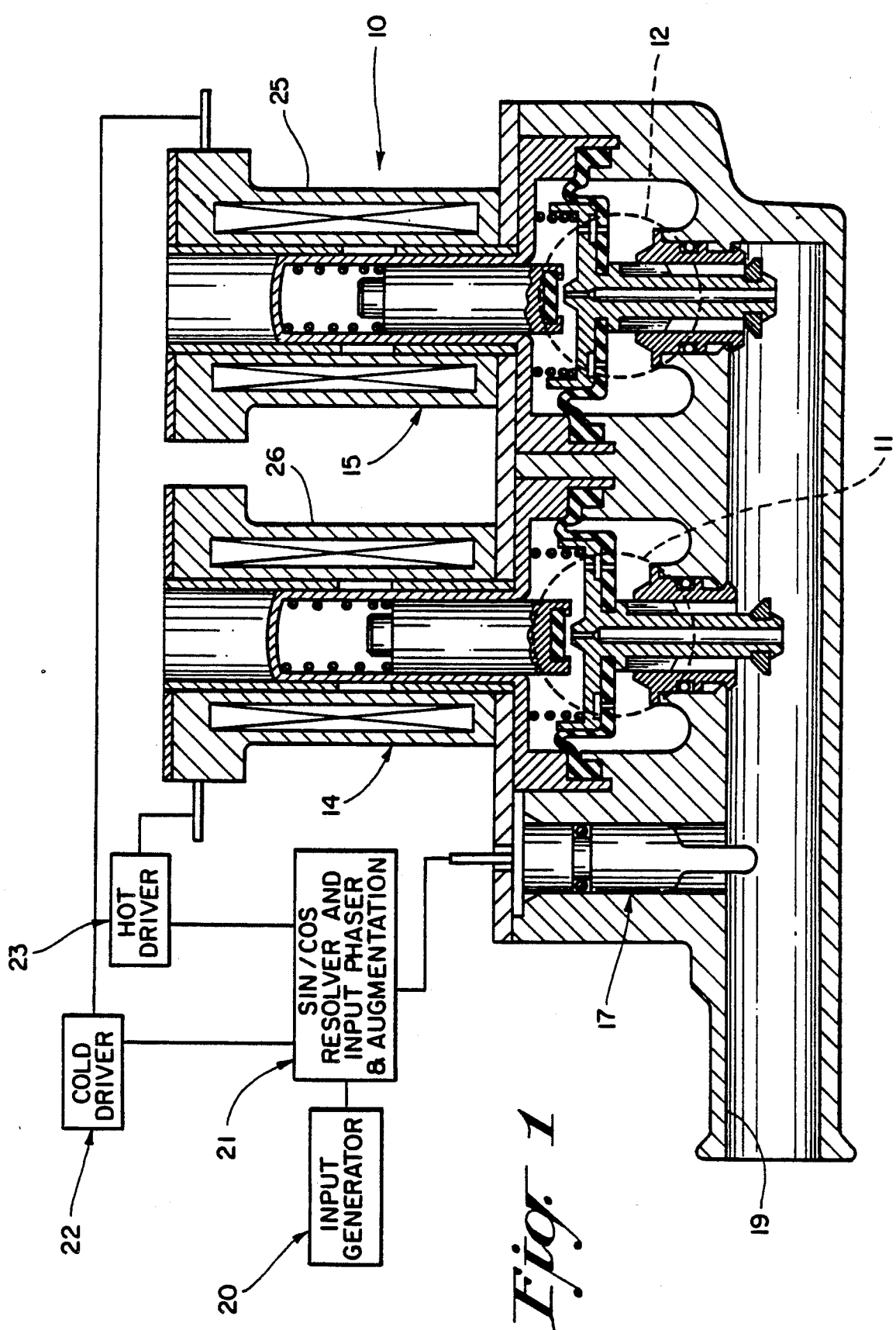
FIG. 1 is a longitudinal section through a mixing valve assembly including two control valves with controls and drivers therefor illustrated in block diagram form.

Referring to the drawings and particularly FIG. 1, mixing valve assembly 10 is illustrated generally adapted to mix cold water from a cold water inlet 11 with hot water from a hot water inlet 12 to provide water to an associate appliance at a pre-selected temperature desired.

Mixing valve 10 generally includes a fluid flow modulating pilot operating control valve assembly 14 for controlling cold water flow and an identical flow modulating valve assembly 15 for controlling hot water flow, and a temperature sensor 17 projecting into an outlet passage 19 where hot water and cold water from valves 14 and 15 mix.

Valves 14 and 15 are controlled by an electronic circuit that includes an Input Generator 20 for deriving variable signals representing the desirable temperature, a SIN/COS Resolver and Input Phaser 21 that receives actual temperature signals from the temperature sensor 17 and provides DC signals to cold driver 22 and hot driver 23 which respectively provide the appropriate coil current for electromagnetic coil assemblies 25 and 26 associated with the valve 15 and 14 respectively.

The valves 14 and 15 are identical and, thus will be described in detail with respect to the embodiment shown in FIGS. 2 to 4 which illustrate the present flow modulation valve as a single valve unit, but it should be understood in connection with the FIG. 1 embodiment, as well as the remaining embodiments, that the control valve assembly according to the present invention is capable of infinite modulation of fluid flow within the range of motion of the control valve assembly, and this characteristic is useful in a wide variety of applications and is particular useful in the two valve mixing valve assembly illustrated in FIG. 1.

The Input Generator 20 develops a pulse train that is phase responsive to an input representing the desired temperature water from outlet passage 19. The SIN/COS Resolver and Input Phrases 21 derives SIN and COS signals that are phased with the pulse train from the input generator 20. The SIN/COS Resolver also phases a pulse train in response to the magnitude of input from the temperature sensor 17 and utilizes this actual temperature sensor pulse train to pick off the DC instantaneous values of the phased SIN and COS signals and utilizes these two as inputs to the cold driver 22 and the hot driver 23. Such SIN/COS Resolvers are conventional and, therefore, the details of the circuitry are unnecessary to the present invention.

A further function of the SIN/COS Resolver 21 is to provide high predetermined signals to the cold driver 22 and the hot driver 23 upon the initial appearance of a signal from Input Generator 20. After a predetermined short period, signals from the SIN/COS Resolver to the cold driver and the hot driver switch to the levels dictated by the pulse train from the Input Generator 20 and the signal from the temperature sensor 17. The reason for this is that the actuators in the valves 14 and 15 require a high opening force to move them from their closed positions. This will be explained more fully in connection with the embodiment shown in FIGS. 2 to 4. Note that both armature seals are open in FIG. 1. Note also in FIG. 1, the main valve or valve 15 is opened less than the main valve of valve 14 to illustrate operation of the mixing valve in proportioning the flows of the hot and cold fluids into the mix chamber 19.

The mixing valve 10 is capable of providing an infinite combination of cold water flow rate from valve 14 and hot water flow rate from hot water valve 15 in an improved manner heretofore not capable in known hot and cold water appliance type mixing valves.

Reference now turns to the embodiment illustrated in FIGS. 2 to 6 which show a single flow modulating pilot operated valve assembly 28 according to the present invention, and it can be readily seen that the operating components thereof are identical to those in the valves 14 and 15 in the FIG. 1 embodiment, so that the following detailed description of valve 28 applies to the valves 14 and 15 in FIG. 1 as well.

Valve 28 generally includes a housing body 30, a combined shut-off and modulating control valve assembly 32 vertically reciprocal within body 30 including a shut-off portion assembly 33 and a modulating portion assembly 35, a pilot valve 37 operated by an armature actuator 40 positioned incrementally within its range of movement by an electromagnetic coil assembly 42. Coil current is applied to coil assembly 42 through terminals 41.

The body 30 is constructed of a suitable plastic, such as polypropylene, and includes an inlet fitting 44 having an inlet passage 45 connected to an inlet chamber 43 so that the pressure of inlet fluid flowing in chamber 43 tends to bias the control valve assembly 32 upwardly.

Control valve assembly 32 defines in housing cover member 47 an intermediate chamber 46 and fluid pressure in intermediate chamber 46 tends to bias the control valve assembly 32 downwardly toward its closed position in engagement with a valve seat 48 formed on a snap-in valve seat sleeve 50 that communicates with an outlet passage 51 in housing 30.

Figure 3:
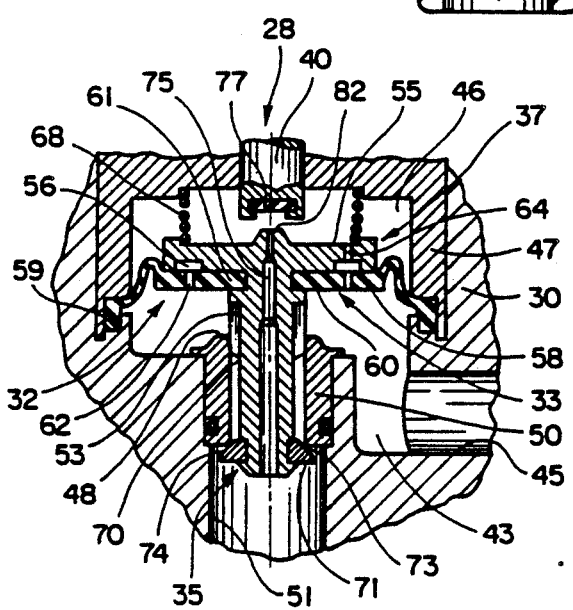
FIG. 3 is a fragmentary section of the control valve illustrated in FIG. 2 with its modulating valve portion in its minimum flow position.

Viewing FIG. 3, the main combined control valve assembly 32 includes a stem 53 having an upper annular flange portion 55 with a lower annular recess 56 therein. A bellows type diaphragm 58 is sandwiched between housing cover 45 and housing 30 in recess 59. Diaphragm 58 has a thick annular central portion 60 fitted in stem recess 61 having a plurality of axial passages 62 therethrough that provide with annular passage 56 and bleed passage 64 in flange 55 a communication between inlet 45 and intermediate chamber 46 that in effect provides a continuous downward biasing force on control valve 32 with coil compression spring 68.

The diaphragm cnetral portion 60 is part of the shut-off portion of assembly 33 and when engaged with valve seat 48 blocks flow from inlet 45 through axial flutes 70 on the sides of valve stem 53 to outlet passage 51.

The modulating valve portion 35 of the main control valve includes the lower end of valve stem 53 that carries a plastic snap-lock valve member 71 having a frusto-conical upper outer surface 73 that variably restricts flow through orifice 74 defined by the lower end of the interior bore of valve seat sleeve 50.

The pilot valve assembly 37 includes a stepped pilot passage 75 extending completely through valve stem 50 communicating intermediate chamber 46 with the outlet passage 51. Pilot passage 75 is variably restricted by a seal 77 carried by the lower end of armature 40.

Referring again to FIG. 2, the armature actuator 40 is cylindrical in configuration and has a reduced upper projection 79 that forms a seat for a coil compression spring 80 seated in a closed ended actuator guide tube 81 formed integrally with cover 45. Spring 80 urges actuator 40 towards its closed position in engagement with pilot valve orifice 82, and operates in opposition to the electromagnetic flux force created by coil assembly 42 which urges the actuator upwardly into guide tube 81.

The coil assembly 42 includes a coil 83 encased in a molded housing 84 carried by a channel-shaped frame 86 fixed to body 30 by a plurality of fasteners 88.

Figure 4:
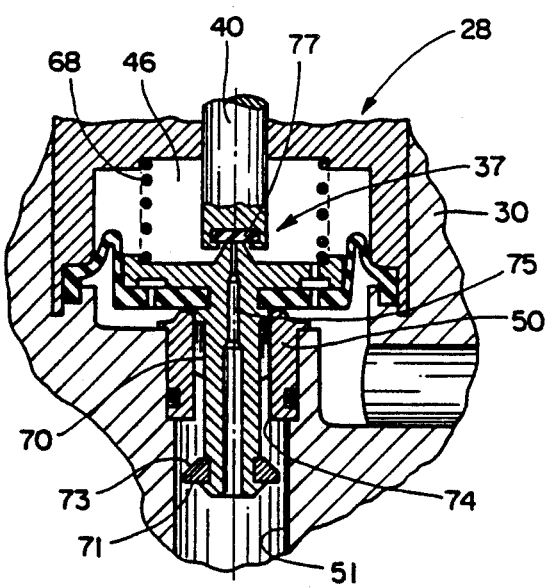
FIG. 4 is a fragmentary section similar to FIG. 2 with the shut-off valve portion closed.

With no current flowing in coil assembly 42, spring 80 biases actuator 40 downwardly to a position where the pilot valve 37 is closed as illustrated in FIG. 4. When inlet fluid is applied to inlet passage 45, it flows through bleed passage 64 into intermediate chamber 46 so that the pressures in inlet 45 and intermediate chamber 46 are equal. Since the outlet passage is at a lower pressure than chamber 46, there is a net differential force on the valve assembly 32 tending to maintain that valve closed under these conditions.

At the same time the actuator 40 also exerts a downward force on the pilot orifice 82 tending to keep it closed. This downward force is a result of both the spring force and the differential pressure force between chamber 46 and the pilot passage 75 acting on the actuator.

The differential pressure tending to hold actuator 40 down against closing pilot valve 37 in the closed nonflowing position illustrated in FIG. 4 is a result of the fact that the pilot passage 75 is at its lowest outlet pressure and passage 45 and chamber 46 are at their highest pressures at this time.

Figure 2:
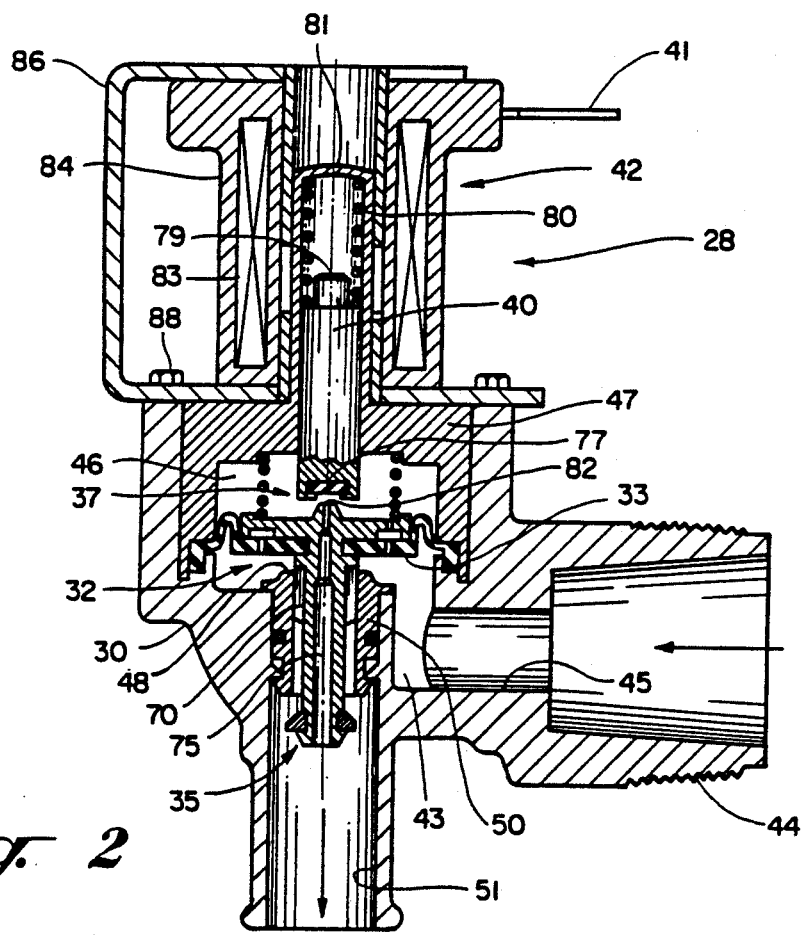
FIG. 2 is a longitudinal section of an improved control valve according to one embodiment of the present invention with its main control valve illustrated approximately in its initial opening position with the minimum valve opening voltage applied to its electromagnetic coil.
Figure 8:
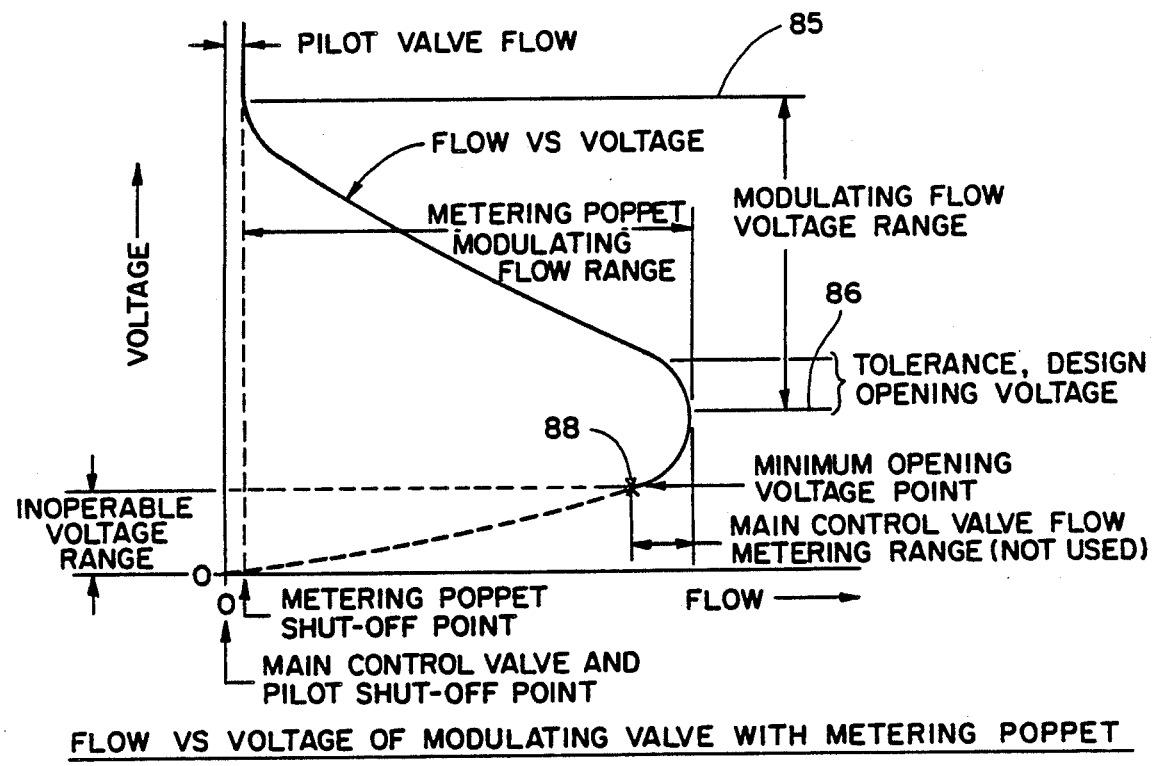
FIG. 8 is a flow versus voltage curve illustrating valve characteristics.

Viewing FIG. 8 along with FIGS. 2, 3 and 4 for a description of the operation of the valve 28, it should be noted that the flow versus voltage curve, above the minimum opening voltage, is generally negative which means that as voltage increases, flow decreases. With zero current flowing through coil 83, the differential pressure in chamber 46 and outlet 51, spring 68 and armature 40 tend to maintain the shut-off valve portion of the main control valve closed. With the application of the minimum opening voltage through coil 83, or some incremental voltage above that value, the actuator 40 will move upwardly to its position illustrated in FIG. 2 and the control valve 32 will follow its movement because of the resulting pressure drop in intermediate chamber 46 caused by the opening of pilot passage 75. When the control valve 32 moves sufficiently upwardly, pilot seal 77 begins restricting pilot orifice 82 and the resulting increase in pressure in chamber 46 creates an equilibrium where control valve 32 stays modulated in the position illustrated in FIG. 2, which is its maximum flow position.

In the maximum flow position illustrated in FIG. 2, or approximately at that position, achieved with at least the minimum opening voltage applied to coil 83, the flow area provided by shut-off valve assembly 33, including diaphragm portion 60 and axial stem flutes 70, is substantially equal to the flow area provided by the modulating valve 35. Thus, if valve 32 moves downwardly from the position shown in FIG. 2, shut-off valve 32 will restrict flow between the inlet and the outlet, and if control valve 32 moves upwardly from that position, modulating valve 35 will restrict flow between the inlet and the outlet.

As can be seen further in FIG. 8, as the voltage applied to coil 83 goes above the minimum opening voltage, the armature 40 moves further upwardly from its position shown in FIG. 2 into a modulation range, which is the intended range of modulation for which the valve is designed. In this flow modulation range, it can be seen that as voltage increases, flow through the valve decreases until it reaches its minimum flow at the maximum voltage value, represented by the position of the valve illustrated in FIG. 3 where the modulating valve 35 is closed. Thus, the minimum flow position illustrated in FIG. 3 is effected by maximum voltage 85 illustrated in FIG. 8 and the minimum modulating voltage 86 illustrated in FIG. 8 is some incremental voltage above the minimum opening voltage 88 shown on the same curve of FIG. 8. Thus, the entire range of valve modulation occurs at a voltage incrementally above the minimum opening voltage 88 minimizing inadvertent valve closure.

Figure 6:
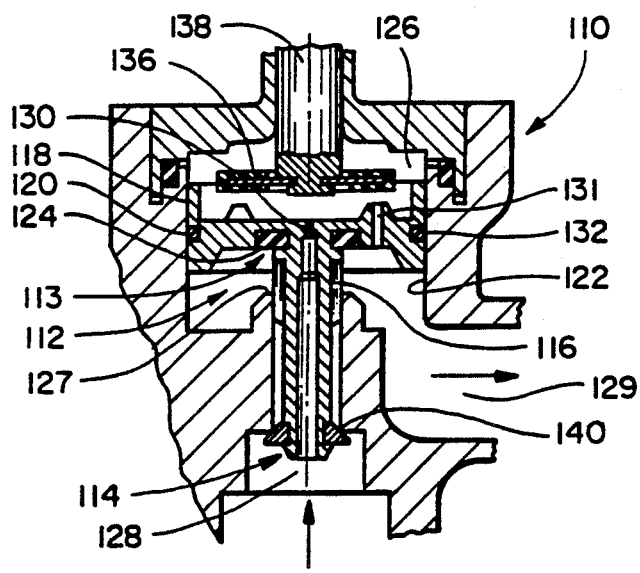
FIG. 6 is a fragmentary longitudinal section similar to FIG. 5 with the main valve positioned in its minimum flow position.
Figure 7:
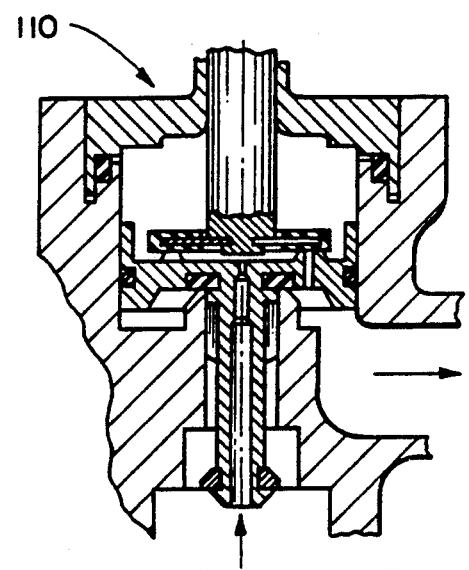
FIG. 7 is a fragmentary section similar to FIGS. 5 and 6 with the main valves' shut-off valve portion closed.
Figure 5:
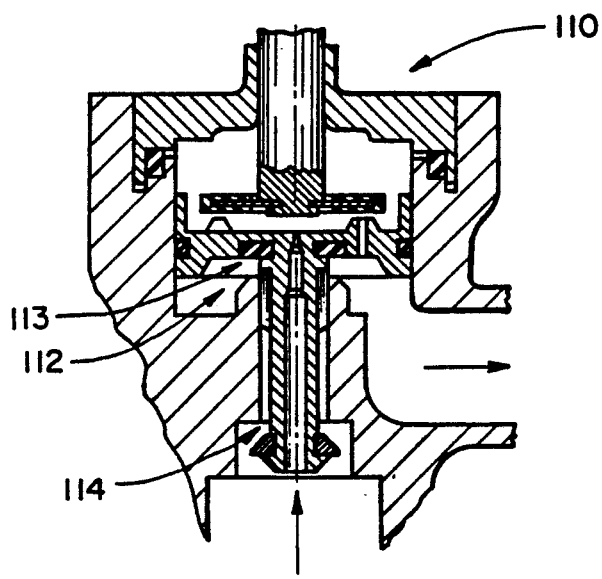
FIG. 5 is a fragmentary longitudinal section of another embodiment of the present control valve with its main valve positioned with a voltage slightly in excess of the minimum opening voltage positioning the valve in its maximum flow position.

The second embodiment of the invention; namely, valve 110 illustrated in FIGS. 5 to 7 operates in exactly the same manner as the FIGS. 2 to 4 valve but has some structural rather than functional differences.

Main control valve assembly 112 has an upper shut-off valve portion 113 and a lower modulating valve portion 114. Valve 112 includes a one-piece stepped stem 116 having an enlarged upper end 118 forming a piston 120 and seal 132 slidable in housing bore 122 to define intermediate chamber 126. Piston 120 has a recess that carries an annular seal 124 that forms part of the shut-off valve selectively engageable with seat 127 to block flow from inlet 128 to outlet 129. Note that the inlet and outlet orientation of the FIGS. 5 to 7 embodiment is opposite that in the FIGS. 2 to 4 embodiment.

Pilot passage position in the FIGS. 2 to 4 embodiment is replaced by bleed passage 130 that communicates inlet 128 to intermediate passage 126 in the same fashion that bleed passage 64 does in the FIGS. 2 to 4 embodiment. A pilot passage 131 extends through piston 120 and communicates outlet 129 with intermediate chamber 126 and flow through the pilot passage is variably restricted by an enlarged sealing disc 136 carried by the lower end of armature 138 that is positioned by an electromagnetic coil assembly identical to that disclosed above with respect to FIGS. 2 to 4. Opening voltage applied to the coil in the FIGS. 5 to 7 embodiment moves main valve 112 to its position illustrated in FIG. 5 which is its maximum flow position where the flow area of shut-off valve position 113 is substantially equal to the flow area of the modulating valve portion 114. As voltage is increased to its maximum from the minimum opening voltage, valve 112 moves upwardly to its minimum flow position illustrated in FIG. 6 where modulating valve 114 blocks flow from inlet 128. Note, however, that as in the FIGS. 2 to 4 embodiment, bleed flow continues from inlet 128 to intermediate chamber 126 exiting through pilot passage 131 to outlet 129 so that flow is not completely blocked when the modulating valve 114 is in its minimum flow position engaged with seat 140.

When the coil is de-energized, armature 138 moves downwardly closing the orifice of pilot passage 131 reversing the pressure differential acting on the valve member 112 causing it to move to its shut-off position illustrated in FIG. 7.

I claim:

1. A flow modulating fluid control valve, comprising: a valve housing having an inlet and an outlet and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating positions so that the force required to move the valve means from its closed position to the maximum flow position is less than the force required to move it to its modulating positions, pilot passage means in the valve means, a spring biased armature having a seal for variably restricting the pilot passage, and an electromagnetic device for infinitely positioning the armature to cause the valve means to follow movement of the armature whereby increasing electromagnetic device voltage decreases flow through the valve means.

2. A flow modulating fluid control valve as defined in claim 1, wherein the valve means includes a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet.

3. A flow modulating fluid control valve as defined in claim 2, wherein the closure valve and the modulating valve are co-axial.

4. A flow modulating fluid control valve as defined in claim 3, wherein the closure valve and the modulating valve have approximately equal flow areas when the valve member is in its maximum flow position.

5. A flow modulating fluid control valve, comprising: a valve housing having an inlet and an outlet, and valve means movably mounted in the housing between a valve closed position blocking flow from the inlet to the outlet, a valve maximum flow position communicating the inlet and the outlet, and a minimum flow position, said valve means being constructed so the maximum flow position is between the closed position and the minimum flow position whereby after opening the valve means moves in a range from maximum flow position and thereafter to its minimum flow position, pilot passage means in the valve means, a spring biased armature having a seal for variably restricting the pilot passage, and an electromagnetic device for infinitely positioning the armature to cause the valve means to follow movement of the armature whereby increasing electromagnetic device voltage decreases flow through the valve means.

6. A flow modulating fluid control valve, comprising: a valve housing having an inlet and an outlet, and valve means movably mounted in the housing between a valve closed position blocking flow from the inlet to the outlet, a valve maximum flow position communicating the inlet and the outlet, and modulating positions variably controlling flow between the inlet and outlet at values equal and less than maximum flow, a variably positioned pilot actuator for causing opening and modulation of the valve means, means for preventing the pilot actuator from causing inadvertent valve instability closure including means for applying a relatively low force to the actuator to position the valve means in its maximum flow position and means for applying a relatively high force to the actuator to position the valve means in its modulating positions, said actuator being an armature and said means to apply a force to the actuator being an electromagnetic device, pilot passage means in the valve means, said armature being spring biased and having a seal for variably restricting the pilot passage, and an electromagnetic device for infinitely positioning the armature to cause the valve means to follow movement of the armature whereby increasing electromagnetic device voltage decreases flow through the valve means.

7. A flow modulating fluid control valve, comprising: a valve housing having an inlet and an outlet and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating positions so that the force required to move the valve means from its closed position to the maximum flow position is less than the force required to move it to its modulating positions, the valve means including a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet, the valve housing having an intermediate chamber between the inlet and the outlet defined by the closure valve, means for controlling pressure in the intermediate chamber to variably control the position of the valve member including a pilot passage in the closure valve communicating the intermediate chamber with one of the inlet and outlet in the housing, and an electromagnetic coil driven actuator having a pilot valve seal at one end for modulating flow through the pilot passage to control movement of the valve member.

8. A flow modulating fluid control valve as defined in claim 7, wherein the closure valve is a diaphragm valve, said pilot passage connecting the intermediate chamber to the outlet passage, and a bleed passage in the closure valve communicating the inlet to the intermediate chamber.

9. A flow modulating fluid control valve as defined in claim 8, wherein the pilot passage is coaxial with and extending axially through the valve member, said bleed passage in the closure valve being offset from the pilot passage.

10. A flow modulating fluid control valve as defined in claim 7, wherein the pilot passage in the closure valve is offset from the valve member, and a bleed passage coaxial with and extending completely through the valve member.

11. A flow modulating fluid control valve as defined in claim 10, wherein the closure valve includes an outer piston slidable in and sealed to the housing to form the intermediate chamber.

12. A flow modulating fluid control valve, comprising: a valve housing having an inlet and an outlet, and valve means movably mounted in the housing between a valve closed position blocking from the inlet to the outlet, a valve maximum flow position communicating the inlet and the outlet, and modulating positions variably controlling flow between the inlet and outlet at values equal to and less than maximum flow, an electromagnetic coil driven actuator for moving the valve means from its closed position to its maximum flow and modulating positions, said actuator having a pilot seal that modulates flow through a pilot passage in the valve means to position the valve means in any desired position, means to minimize inadvertent valve means instability including means for applying a relatively low voltage to the electromagnetic coil to position the valve means in its maximum flow position, and means for applying a relatively high voltage to the electromagnetic coil to position the valve means in its modulating positions whereby voltage and pressure transients, while the valve is in its modulating positions, will not cause valve means instability.

13. A flow modulating fluid control valve, comprising: a valve housing having an inlet and an outlet, and valve means movably mounted in the housing between a valve closed position blocking from the inlet to the outlet, a valve maximum flow position communicating the inlet and the outlet, and modulating positions variably controlling flow between the inlet and outlet at values equal to and less than maximum flow, an electromagnetic coil driven actuator for moving the valve means from its closed position to its maximum flow and modulating positions, said actuator having a pilot seal that modulates flow through a pilot passage in the valve means to position the valve means in any desired position, means to minimize inadvertent valve means instability including means for applying a relatively low voltage to the electromagnetic coil to position the valve means in its maximum flow position, and means for applying a relatively high voltage to the electromagnetic coil to position the valve means in its modulating positions whereby voltage and pressure transients, while the valve is in its modulating positions, will not cause valve means instability, said valve means being constructed so the maximum flow position is between the closed position and the modulating positions so that the force required to move the valve means from its closed position to the maximum flow position is less than the force required to move it to its modulating positions.

14. A flow modulating fluid control valve as defined in claim 13, wherein the valve means includes a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet.

15. A flow modulating fluid control valve as defined in claim 14, wherein the valve housing has an intermediate chamber between the inlet and the outlet defined by the closure valve, means for controlling pressure in the intermediate chamber to variably control the position of the valve member including a pilot passage in the closure valve communicating the intermediate chamber with one of the inlet and outlet in the housing.

16. A flow modulating fluid control valve as defined in claim 14, wherein the closure valve and the modulating valve are coaxial.

17. A flow modulating fluid control valve as defined in claim 16, wherein the closure valve and the modulating valve have approximately equal flow areas when the valve member is in its maximum flow position.

18. A flow modulating fluid control valve, comprising: a valve housing having an inlet and an outlet, and valve means movably mounted in the housing between a valve closed position blocking from the inlet to the outlet, a valve maximum flow position communicating the inlet and the outlet, and modulating positions variably controlling flow between the inlet and outlet at values less than maximum flow, an electromagnetic coil driven actuator for moving the valve means from its closed position to its maximum flow and modulating positions, said actuator having a pilot seal that modulates flow through a pilot passage in the valve means to position the valve means in any desired position, means to minimize inadvertent valve means instability including means for applying a relatively low voltage to the electromagnetic coil to position the valve means in its maximum flow position, means for applying a relatively high voltage to the electromagnetic coil to position the valve means in its modulating positions whereby voltage and pressure transients while the valve is in its modulating positions will not cause valve means instability, said valve means being constructed so the maximum flow position is between the closed position and the modulating positions so that the force required to move the valve means from its closed position to the maximum flow position is less than the force required to move it to its modulating positions, said valve means including a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet.

19. A mixing valve assembly for appliances requiring a mixture of hot and cold fluids, comprising: a first control valve assembly connected to a source of cold fluid including a valve housing having an inlet and an outlet, and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating position so that the force required to move the valve means from its closed position to the maximum flow position is less than the force required to move it to its modulating positions, a second control valve assembly connected to a source of hot fluid including a valve housing having an inlet and an outlet, and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating positions so that the force required to move the valve means from its closed position to the maximum flow position is less than the force required to move it to its modulating positions, each of said control valve assemblies including pilot passage means in the valve means, a spring biased armature having a seal for variably restricting the pilot passage, and an electromagnetic device for infinitely positioning the armature to cause the valve means to follow movement of the armature whereby increasing electromagnetic device voltage decreases flow through the valve means.

20. A mixing valve assembly for appliances requiring a mixture of hot and cold fluids as defined in claim 19, wherein each of the first and second control valves include a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet.

21. A mixing valve assembly for appliances requiring a mixture of hot and cold fluids as defined in claim 20, wherein the closure valves and the modulating valves are co-axial.

22. A mixing valve assembly for appliances requiring a mixture of hot and cold fluids as defined in claim 21, wherein the closure valves and the modulating valves have approximately equal flow areas when the valve members are in their maximum flow positions.

23. A mixing valve assembly for appliances requiring a mixture of hot and cold fluids, comprising: a first control valve assembly connected to a source of cold fluid including a valve housing having an inlet and an outlet, and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating position so that the force required to move the valve means from its closed position to the maximum flow position is less than the force required to move it to its modulating positions, a second control valve assembly connected to a source of hot fluid including a valve housing having an inlet and an outlet, and valve means movably mounted in the housing between a valve closed position blocking flow from the inlet to the outlet, a valve maximum flow position communicating the inlet and the outlet and modulating positions variably controlling flow between the inlet and outlet at values equal to and less than maximum flow, said valve means being constructed so the maximum flow position is between the closed position and the modulating positions so that the force required to move the valve means from its closed position to the maximum flow position is less than the force required to move it to its modulating positions, each of the first and second control valves including a valve member having a closure valve at one end that blocks flow from the inlet to the outlet and a modulating valve at its other end so that as the valve member moves in one direction the closure valve opens and the modulating valve reduces flow from the inlet to the outlet, and as the valve member moves in the opposite direction the closure valve moves toward its closed position and the modulating valve increases flow from the inlet to the outlet, each of the first and second control valve housings having an intermediate chamber between the inlet and the outlet defined by the closure valve, means for controlling pressure in the intermediate chamber to variably control the position of the valve member including a pilot passage in the closure valve communicating the intermediate chamber with one of the inlet and outlet in the housing, and an electromagnetic coil driven actuator having a pilot valve seal at one end for modulating flow through the pilot passage to control movement of the valve member.

* * * * *